Jan. 17, 1967  H. P. HENDERSON  3,298,272
PROTECTIVE AND DECORATIVE CAP FOR SCREW AND BOLT HEADS
Filed Oct. 20, 1964

INVENTOR.
HAROLD P. HENDERSON
BY
Christel & Bean
ATTORNEYS

3,298,272
PROTECTIVE AND DECORATIVE CAP FOR SCREW AND BOLT HEADS

Harold P. Henderson, 271 Northwood Drive, Tonawanda, N.Y. 14150
Filed Oct. 20, 1964, Ser. No. 405,180
1 Claim. (Cl. 85—53)

This invention relates to protective caps for screw and bolt heads and particularly to molded thermoplastic caps which discourage tampering with screws and bolts to which such caps have been applied.

Considerable damage is caused, particularly in more or less public places, by tampering with screws and bolts, whereby fixtures of various kinds are loosened or removed. This tampering is commonly the work of sheer vandalism, as distinguished from planned or deliberate theft. Pranksters, usually young people, frequently remove screws which mount wall fixtures, bus seats, and other devices of this general nature, not especially for the purpose of theft but merely to cause damage. Fixtures and other articles thus loosened or removed frequently become damaged or lost, thus causing considerable financial loss to the owners or others responsible for the safety and maintenance thereof.

The present invention provides a readily applied thermoplastic cover for screw and bolt heads of various types which prevent, or at least make it more difficult, to tamper with such screws or bolts, especially by more or less idle tampering such as is frequently practiced by pranksters or vandals.

In the case of screw or bolt heads which are set into counterbores in the surface of the part held thereby the cap of the present invention is proportioned to fit closely about the screw head and the outside diameter of the cap preferably fits fairly closely into the counterbore. By proportioning the counterbore and the cap so that the upper surface of the latter is approximately flush with the surface of the counterbored part or set beneath such surface the possibility of removing the cap will not be readily apparent and a special tool, such as a sharp pointed instrument will be required. This will usually serve as a sufficient deterrent to vandalism or tampering of the kind with which the present invention particularly concerns itself. Furthermore, if removal of the protective cap is accomplished by an unauthorized person, this fact will be readily apparent upon inspection.

In cases where the head of the screw or bolt is exposed above the surface of the part to which the screw or bolt is applied, the cap is adhesively secured to the screw or bolt head by means of a suitable cement and its exterior is round to militate against turning the screw or bolt by grasping the protective cap. Here again, if the cap is nevertheless forcibly removed, such removal will be readily apparent to those responsible for the maintenance of the devices to which the screws or bolts are applied.

While a single specific embodiment of the principles of the present invention is illustrated in the accompanying drawing and described in detail in the following specification, it is to be understood that such embodiment is by way of example only and that various mechanical modifications may be made without departing from the spirit of the invention, the scope of which is limited only as defined in the appended claims.

Figure 2:
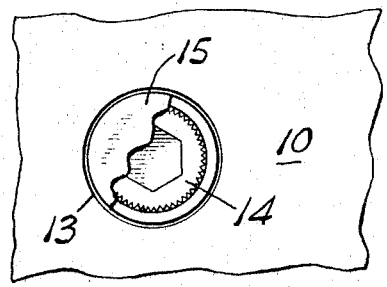
FIG. 2 is a top plan view of the screw head and cap construction of FIG. 1 with a portion of the cap element broken away.
Figure 1:
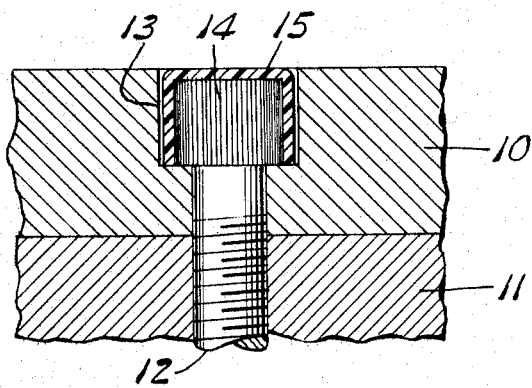
FIG. 1 is a vertical cross sectional view through a screw fastening wherein the screw head is countersunk into the work showing one form of the protective cap of the present invention.

Referring first to the embodiment of the present invention illustrated in FIGS. 1 and 2 of the drawing, the numerals 10 and 11 designate a pair of parts adapted to be held together by a socket head screw 12. The part 10 is counterbored as at 13 to receive head 14 of screw 12, such head being serrated as shown, this being conventional construction in socket head screws.

The numeral 15 designates a generally cup-shaped molded thermoplastic protective cap which fits closely over the outer periphery of the head 14 of screw 12, in the present instance over the serrations formed theereon. It will be noted that the outer diameter of cap 15 fits moderately closely within the counterbore 13 and the outer flat surface of the cap is substantially flush with the outer surface of part 10.

From this it will be observed that, once the screw 12 has been properly assembled and tightened, the cap 15 is merely pressed into the protective position clearly illustrated in FIG. 1 and unauthorized loosening or removal of the screw is deterred since it is necessary to remove the cap 15 or substantially multilate the upper end thereof before the socket in screw head 14 is accessible. Furthermore, as indicated earlier herein, any such removal or mutilation of the cap 15 will be readily apparent upon inspection.

In instances where screw or bolt heads of other styles are recessed into counterbores, hex heads for instance, the interior of the protective cap may be formed to complement the shape of the screw head and, since greater clearance may then exist between the screw head and the counterbore to admit a socket wrench or the like, the skirt thickness of the protective cap may be proportionately greater to more or less fill the counterbore and make it more difficult to remove the cap.

Figure 3:
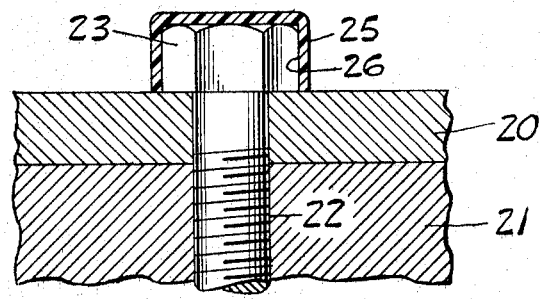
FIG. 3 is a vertical cross sectional view through a screw or bolt fastening wherein the head of the screw or bolt is exposed showing a modified form of cap applied thereto in accordance with the present invention.
Figure 4:
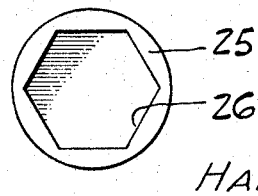
FIG. 4 is a bottom plan view of the cap of FIG. 3.

FIG. 3 shows a screw or bolt fastening wherein the head of the screw or bolt is entirely exposed at the surface of the work. In FIG. 3 the parts to be secured by the screw are designated 20 and 21 and the screw is designated 22. Screw 22 has a hexagonal head 23 and a protective cap 25 is of cup-shaped thermoplastic material molded to provide a hexagonal interior 26 for fitting sungly over the head 23 of screw 22.

To prevent removal of cap 25 without mutilation thereof and thus deter tampering the interior of cap 25 is cemented or otherwise adhesively secured to head 23 of screw 22. Thus the cap must be virtually destroyed to remove the same which, besides the tamper-deterrent properties thus brought about, renders detection of tampering readily attainable upon casual inspection.

What is claimed is:

In a screw fastening in combination, a screw having a polygonal head and threaded shank portions and a part to be engaged by said screw, said part having a hole for receiving the screw shank, and a protective cover closely fitting said screw head comprising a cup-shaped thermoplastic member having an opening therein complementary to the shape of said screw head and an imperforate end wall enclosing the upper surface of said screw head, said cover extending downwardly substantially to the base of said screw head to define a cylindrical outer side wall, and a layer of a bonding agent between said opening of said cup-shaped member and said screw head for adhesively securing the protective cover to the screw head.

References Cited by the Examiner

UNITED STATES PATENTS 3,134,290   5/1964   Jentoft _____ 85—54

FOREIGN PATENTS

| 684,821 | 12/1952 | Great Britain. |
| 916,161 | 1/1963 | Great Britain. |
| 953,009 | 3/1964 | Great Britain. |

CARL W. TOMLIN, *Primary Examiner.*

R. S. BRITTS, *Assistant Examiner.*